(12) United States Patent
Han et al.

(10) Patent No.: US 10,353,268 B2
(45) Date of Patent: Jul. 16, 2019

(54) ACOUSTO-OPTIC ELEMENT, ACOUSTO-OPTIC ELEMENT ARRAY, AND DISPLAY APPARATUS INCLUDING THE ACOUSTO-OPTIC ELEMENT

(71) Applicants: SAMSUNG ELECTRONICS CO., LTD., Suwon-si (KR); AJOU UNIVERSITY INDUSTRY-ACADEMIC COOPERATION FOUNDATION, Suwon-si (KR)

(72) Inventors: Seung-hoon Han, Seoul (KR); Won-taek Seo, Yongin-si (KR); Hae-kwan Oh, Suwon-si (KR); Hong-seok Lee, Seongnam-si (KR); Eun-hyoung Cho, Hwaseong-si (KR); Kee-keun Lee, Yongin-si (KR)

(73) Assignees: SAMSUNG ELECTRONICS CO., LTD., Suwon-si (KR); AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 43 days.

(21) Appl. No.: 15/641,687

(22) Filed: Jul. 5, 2017

(65) Prior Publication Data

US 2017/0299942 A1    Oct. 19, 2017

Related U.S. Application Data

(62) Division of application No. 14/321,353, filed on Jul. 1, 2014, now Pat. No. 9,778,541.

(30) Foreign Application Priority Data

Dec. 9, 2013    (KR) .................. 10-2013-0152652

(51) Int. Cl.
*G02B 1/00* (2006.01)
*G02F 1/33* (2006.01)
(Continued)

(52) U.S. Cl.
CPC .............. *G02F 1/332* (2013.01); *G02B 27/22* (2013.01); *G02F 1/335* (2013.01); *G03H 1/2294* (2013.01);
(Continued)

(58) Field of Classification Search
CPC ...... G02F 1/332; G02F 1/335; G02F 2002/32; G02B 27/22; G02B 1/005; G03H 1/2294; G03H 2001/0224; G03H 2225/21
(Continued)

(56) References Cited

U.S. PATENT DOCUMENTS 4,068,191 A    1/1978  Zemon et al.
4,726,651 A    2/1988  Wei et al.
(Continued)

FOREIGN PATENT DOCUMENTS

JP    2005-326710 A    11/2005
KR    10-0466622 B1    1/2005
KR    10-2013-0022084 A    3/2013

OTHER PUBLICATIONS

D. E. Smalley, et al., "Anisotropic leaky-mode modulator for holographic video displays", MIT, Nature, vol. 498, Jun. 20, 2013, pp. 313-318.
(Continued)

*Primary Examiner* — Collin X Beatty
(74) *Attorney, Agent, or Firm* — Sughrue Mion, PLLC

(57) ABSTRACT

Provided are an acousto-optic element, an acousto-optic element array, and a display apparatus including the acousto-optic element array. The acousto-optic element includes: an acousto-optic modulator which includes an acousto-optic layer formed of an acousto-optic material; a light supplier which supplies light to the acousto-optic modulator in a first direction; a first sound-wave modulator which applies first elastic waves to the acousto-optic modulator in a second
(Continued)

direction; and a second sound-wave modulator which applies second elastic waves to the acousto-optic modulator in a third direction. The light supplied from the light supplier to the acousto-optic modulator is deflected by diffraction caused by the first elastic waves applied from the first sound-wave modulator and diffraction caused by the second elastic waves applied from the second sound-wave modulator, and is output from the acousto-optic modulator through a front side of the acousto-optic modulator.

23 Claims, 14 Drawing Sheets

(51) Int. Cl.
　　*G03H 1/02* (2006.01)
　　*G03H 1/22* (2006.01)
　　*G02B 27/22* (2018.01)
　　*G02F 1/335* (2006.01)
(52) U.S. Cl.
　　CPC .......... *G02B 1/005* (2013.01); *G02F 2202/32* (2013.01); *G03H 2001/0224* (2013.01); *G03H 2225/21* (2013.01)
(58) Field of Classification Search
　　USPC ............................................. 359/9, 305–315
　　See application file for complete search history.

(56) References Cited

U.S. PATENT DOCUMENTS

| | | | |
|---|---|---|---|
| 6,052,215 A | 4/2000 | Montgomery et al. | |
| 6,282,332 B1 | 8/2001 | Bosso et al. | |
| 6,587,255 B2* | 7/2003 | Davidson | G02F 1/33 333/150 |
| 6,754,403 B1 | 6/2004 | Schmid | |
| 7,027,199 B2 | 4/2006 | Johnson | |
| 7,894,125 B2 | 2/2011 | Langdon | |
| 8,149,265 B2 | 4/2012 | Smalley et al. | |
| 8,873,131 B2 | 10/2014 | Han et al. | |
| 2002/0135863 A1 | 9/2002 | Fukshima et al. | |
| 2006/0045163 A1 | 3/2006 | Chuang et al. | |
| 2006/0093296 A1 | 5/2006 | Jin et al. | |
| 2008/0030741 A1 | 2/2008 | Digonnet et al. | |
| 2008/0089366 A1 | 4/2008 | Liu | |
| 2008/0225376 A1 | 9/2008 | Kim | |
| 2009/0147344 A1 | 6/2009 | Lovering et al. | |
| 2011/0081123 A1 | 4/2011 | Pare et al. | |
| 2011/0188116 A1 | 8/2011 | Ledentsov | |
| 2012/0069417 A1 | 3/2012 | Duncan et al. | |
| 2012/0194885 A1 | 8/2012 | Han et al. | |
| 2013/0003066 A1 | 1/2013 | Han et al. | |
| 2013/0050787 A1 | 2/2013 | Han et al. | |
| 2014/0139652 A1* | 5/2014 | Aiden | H04N 13/32 348/54 |
| 2014/0300695 A1* | 10/2014 | Smalley | G02F 1/011 348/40 |
| 2015/0160611 A1* | 6/2015 | Song | G03H 1/2294 348/40 |
| 2016/0223988 A1 | 8/2016 | Bove et al. | |

OTHER PUBLICATIONS

David Fattal, et al "A multi-directional backlight for a wide-angle, glasses-free three-dimensional display"; Letter Research; Nature; vol. 495; Mar. 21, 2013; pp. 348-351.

* cited by examiner 2D  3D

ACOUSTO-OPTIC ELEMENT, ACOUSTO-OPTIC ELEMENT ARRAY, AND DISPLAY APPARATUS INCLUDING THE ACOUSTO-OPTIC ELEMENT

CROSS REFERENCE TO RELATED APPLICATIONS

This is a Divisional of U.S. application Ser. No. 14/321,353, filed on Jul. 1, 2014, and claims priority from Korean Patent Application No. 10-2013-0152652, filed on Dec. 9, 2013, in the Korean Intellectual Property Office, the disclosures of which are incorporated herein by reference in their entireties.

BACKGROUND

1. Field

The exemplary embodiments relates to an acousto-optic element, an acousto-optic element array, and a display apparatus including the acousto-optic element. In particular, exemplary embodiments relate to an acousto-optic element capable of directing light in multiple directions, an acousto-optic element array, and a display apparatus including the acousto-optic element.

2. Description of the Related Art

An acousto-optic effect refers to the effect of changing optical characteristics of media using sound waves or ultrasonic waves. If light is incident on a medium changed in optical characteristics by the acousto-optic effect, the light is modulated according to the amount of change in the optical characteristics of the medium and is output from the medium. For example, the refractive index of a medium may be periodically changed by the acousto-optic effect so as to use the medium as a phase grating capable of diffracting light. In this case, the intensity or diffraction angle of light may be adjusted by changing the intensity or frequency of sound waves or ultrasonic waves applied to the medium. Thus, an optical modulator for modulating the amplitude of light or a scanner for deflecting light may be realized using the acousto-optic effect.

Research has been conducted on display technology using such optical modulators or scanners using the acousto-optic effect.

Related art binocular-parallax 3-dimensional image displays provide 3-dimensional images to viewers by generating left-eye and right-eye images having different viewpoints. Such 3-dimensional image displays may be classified into a glasses type and a non-glasses type.

Research into holographic 3-dimensional image displays has been conducted to provide more natural 3-dimensional images. Light may be considered as waves having intensity and phase, and holography is used to display 3-dimensional images by controlling the intensity and phase of light. Therefore, holographic 3-dimensional image displays include elements capable of controlling the amplitude (intensity) or phase of light.

SUMMARY

Exemplary embodiments may provide an acousto-optic element capable of directing light in multiple directions.

Exemplary embodiments may provide a flat panel type acousto-optic element array capable of directing light in multiple directions.

Exemplary embodiments may provide a display apparatus including the acousto-optic element array.

Additional aspects will be set forth in part in the description which follows and, in part, will be apparent from the description, or may be learned by practice of the presented embodiments.

According to an aspect of the exemplary embodiments, an acousto-optic element includes: an acousto-optic modulator which includes an acousto-optic layer formed of an acousto-optic material; a light supplier which supplies light to the acousto-optic modulator in a first direction; a first sound-wave modulator which applies first elastic waves to the acousto-optic modulator in a second direction; and a second sound-wave modulator which applies second elastic waves to the acousto-optic modulator in a third direction, wherein the light supplied from the light supplier to the acousto-optic modulator is deflected by diffraction caused by the first elastic waves applied from the first sound-wave modulator and diffraction caused by the second elastic waves applied from the second sound-wave modulator, and is output from the acousto-optic modulator through a front side of the acousto-optic modulator.

The first to third directions may be different directions defined in the acousto-optic layer.

The acousto-optic material may include at least one of $ZnO$, $LiNbO_3$, $LiTaO_3$, quartz, $TiO_2$, $Si$, $SiN$, $AlN$, $SiO_2$, and $SrTiO_3$.

The acousto-optic modulator may include: a core layer which receives light; a first cladding layer disposed under the core layer and having a refractive index which is different from a refractive index of the core layer; and a second cladding layer disposed above the core layer and having a refractive index which is different from the refractive index of the core layer.

The refractive index of the core layer may be greater than the refractive index of each of the first cladding layer and the second cladding layer.

At least one of the first cladding layer and the second cladding layer may be an air layer.

The acousto-optic layer may be at least one of the core layer, the first cladding layer, and the second cladding layer.

The core layer may include a periodic photonic crystal structure in which a plurality of unit cells including a pattern are repeated.

The periodic photonic crystal structure of the core layer may be a periodic structure in which at least two materials having different dielectric constants are periodically arranged in a 2-dimensional or 3-dimensional manner.

The first cladding layer and the second cladding layer may include a same periodic photonic crystal structure as the periodic photonic crystal structure of the core layer.

The periodic photonic crystal structure of the core layer may be formed in such a manner that an equifrequency contour of a plurality of optical wave vectors may be flat in the first direction and the second direction.

The photonic crystal structure of the acousto-optic modulator may decelerate light or surface acoustic waves.

The photonic crystal structure may have periodic sizes of several nanometers to several hundreds of nanometers.

The core layer may include a dielectric substrate and a plurality of holes formed in the dielectric substrate, and the holes may be arranged in a periodic structure in which unit cells having a predetermined pattern are repeated.

Air may be filled in the holes, or a dielectric material having a refractive index different from that of the dielectric substrate may be filled in the holes.

The core layer may include a dielectric substrate and a plurality of dielectric pillars formed in the dielectric substrate, and the dielectric pillars may be arranged in a periodic structure in which unit cells having a predetermined pattern are repeated.

The acousto-optic modulator may further include a reflection layer under the first cladding layer.

The acousto-optic modulator may further include a substrate under the reflection layer.

The acousto-optic layer may be at least one of the core layer, the first cladding layer, the second cladding layer, the reflection layer, and the substrate.

At least one of the core layer, the first cladding layer, the second cladding layer, the reflection layer, and the substrate may be formed of a piezoelectric material which is used as a sound wave generator of at least one of the first sound-wave modulator and the second sound-wave modulator. The piezoelectric material comprises at least one of ZnO, PZT, $LiNbO_3$, $LiTaO_3$, quartz, and $SrTiO_3$.

A first sound wave generator of the first sound-wave modulator and a second sound wave generator of the second sound-wave modulator may be formed in different layers.

At least two of the core layer, the first cladding layer, the second cladding layer, the reflection layer, and the substrate may be formed of a piezoelectric material to be used as the first and second sound wave generators.

The light supplier may include: an optical waveguide disposed at a first side of the acousto-optic modulator; and an optical coupler disposed between the optical waveguide and the acousto-optic modulator.

The optical coupler may be a grating coupler. The grating coupler may be a pattern of grooves or materials having different refractive indexes.

The acousto-optic modulator may have at least three sides, and the light supplier, the first sound-wave modulator, and the second sound-wave modulator may be disposed at different sides of the acousto-optic modulator.

The light supplier may be disposed at a first side of the acousto-optic modulator, the first sound-wave modulator may be disposed at a second side of the acousto-optic modulator, and the second sound-wave modulator may be disposed at a third side of the acousto-optic modulator, wherein the first to third sides may be different sides.

The first sound-wave modulator may include: a first sound wave generator disposed at the second side of the acousto-optic modulator; and a first high-frequency waveguide through which first high-frequency power may applied to the first sound wave generator, wherein the second sound-wave modulator may include: a second sound wave generator disposed at the third side of the acousto-optic modulator; and a second high-frequency waveguide through which second high-frequency power may be applied to the second sound wave generator.

The first sound wave generator and the second sound wave generator may be formed in different layers.

The first high-frequency waveguide and the second high-frequency waveguide may be formed in different layers.

The first high-frequency power of the first high-frequency waveguide, and the second high-frequency power of the second high-frequency waveguide may be respectively adjusted in frequency and phase and intensity according to the frequency, such that a shape, direction, and intensity of the light output is controlled from the acousto-optic modulator through the front side of the acousto-optic modulator.

A plurality of sound absorbing members may be disposed outside the first sound-wave modulator and the second sound-wave modulator, respectively.

According to another aspect of the exemplary embodiments, an acousto-optic element array includes a plurality of acousto-optic elements, wherein each of the plurality of acousto-optic elements includes: an acousto-optic modulator which includes an acousto-optic layer formed of an acousto-optic material; a light supplier which supplies light to the acousto-optic modulator in a first direction; a first sound-wave modulator which applies first elastic waves to the acousto-optic modulator in a second direction; and a second sound-wave modulator which applies second elastic waves to the acousto-optic modulator in a third direction, wherein the light supplied from the light supplier to the acousto-optic modulator is deflected by diffraction caused by the first elastic waves applied from the first sound-wave modulator and diffraction caused by the second elastic waves applied from the second sound-wave modulator, and is output from the acousto-optic modulator through a front side of the acousto-optic modulator, wherein a plurality of acousto-optic modulators corresponding to each of the plurality of acousto-optic elements are arranged in at least one line.

The acousto-optic modulator may be arranged in a single line.

The light supplier, the first sound-wave modulator, and the second sound-wave modulator of each of the plurality of acousto-optic elements may be disposed at different positions of a front end, a rear end, a side, and an other side of the single line of the acousto-optic modulators.

One of the light supplier, the first sound-wave modulator, and the second sound-wave modulator which is disposed at the side or the other side of the single line of the acousto-optic modulators may be formed to extend along the single line and may be commonly used for the acousto-optic modulators.

One of the light supplier, the first sound-wave modulator, and the second sound-wave modulator which is disposed at the side or the other side of the line of the acousto-optic modulators may be individually provided for each of the acousto-optic modulators.

One of the light supplier, the first sound-wave modulator, and the second sound-wave modulator which is disposed at the front end or the rear end of the line of the acousto-optic modulators may be commonly used for the acousto-optic modulators.

The acousto-optic modulators may be arranged in a plurality of columns and a plurality of rows.

The light supplier of the plurality of acousto-optic elements may extend along an outer side of one of outermost columns of the acousto-optic modulators.

The light supplier of the plurality of acousto-optic elements may extend along sides of the respective columns of the acousto-optic modulator.

The first sound-wave modulator of the plurality of acousto-optic elements may extend along an outer side of one of outermost rows of the acousto-optic modulators.

A plurality of the first sound-wave modulators of the plurality of acousto-optic elements may be arranged along an outer side of one of outermost rows of the acousto-optic modulators, so as to be respectively disposed at the columns of the acousto-optic modulators.

A plurality of first sound-wave modulators of the plurality of acousto-optic elements may be formed to extend along sides of the respective rows of the acousto-optic modulators.

A plurality of first sound-wave modulators of the plurality of acousto-optic elements may be individually arranged at sides of the respective rows of the acousto-optic modulators.

The second sound-wave modulator of the plurality of acousto-optic elements may extend along an outer side of the other of the outermost columns of the acousto-optic modulators.

A plurality of second sound-wave modulators of the plurality of acousto-optic elements may be arranged along the outer side of an other of the outermost columns of the acousto-optic modulators, so as to be respectively disposed at the rows of the acousto-optic modulators.

A plurality of second sound-wave modulators of the plurality of acousto-optic elements may be formed to extend along sides of the respective columns of the acousto-optic modulators.

A plurality of second sound-wave modulators of the plurality of acousto-optic elements may be individually arranged at sides of the respective columns of the acousto-optic modulators.

According to another aspect of the exemplary embodiments, a display apparatus includes a display panel including the acousto-optic element array, wherein a plurality of images are displayed by controlling at least one of directions, phases, and intensities of the light output from front sides of the acousto-optic modulators 2-dimensionally arranged in the display panel.

The display apparatus displays 2-dimensional images having a single viewpoint regardless of the directions of the light output from the display panel.

The display panel may adjust viewpoint data of the images according to the directions of the light output from the display panel so as to form at least two visual fields for displaying 3-dimensional images.

Switching between 2-dimensional images and 3-dimensional images may be performed by selectively adjusting image data according to the directions of the light output from the display panel.

The at least two visual fields may be formed in at least one of a horizontal direction and a vertical direction.

A plurality of hologram images may be displayed by adjusting the intensities and the phases of the light output from the display panel according to the directions of the light.

According to exemplary embodiments, the direction of the light output from the acousto-optic element may be controlled in horizontal and vertical directions by using the acousto-optic effect, and the shape, intensity, and/or phase of the light may also be controlled.

According to exemplary embodiments, the acousto-optic element array may be flat and may be used in a 2-dimensional display apparatus, 3-dimensional display apparatus, a 2D/3D convertible display apparatus, a multi-viewpoint 3-dimensional display apparatus, and a holographic display apparatus.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF EXEMPLARY EMBODIMENTS

Figure 1:
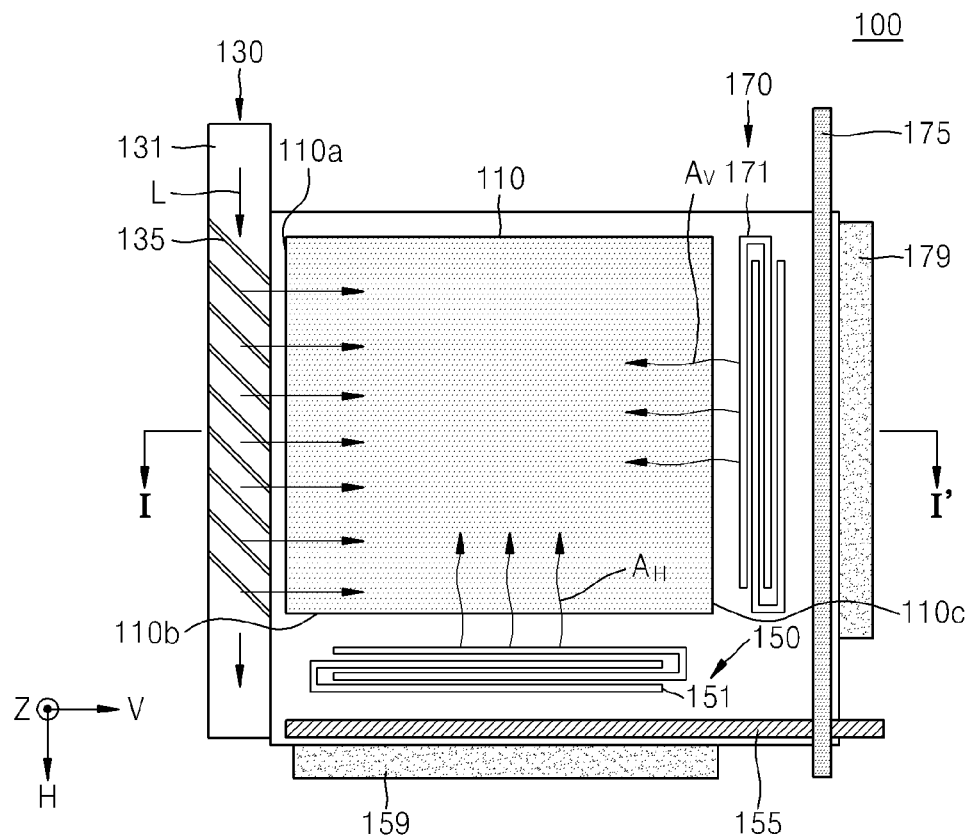
FIG. 1 is a schematic plan view illustrating an acousto-optic element according to according to an embodiment.

Reference will now be made in detail to embodiments, examples of which are illustrated in the accompanying drawings. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, exemplary embodiments will be described in detail with reference to the accompanying drawings. In the drawings, like reference numbers refer to like elements, and the size of each element may be exaggerated for clarity of illustration.

Figure 2:
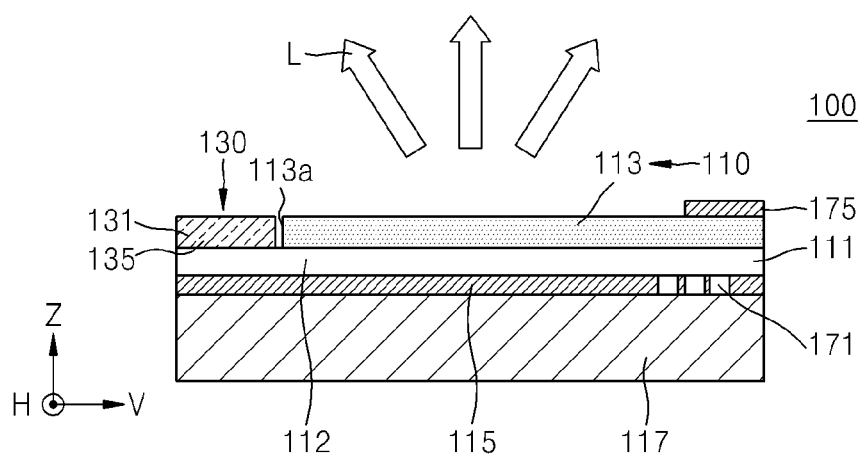
FIG. 2 is a schematic side sectional view of the acousto-optic element, taken along line I-I' of FIG. 1.

FIG. 1 is a schematic plan view illustrating an acousto-optic element 100 according to according to an embodiment, and FIG. 2 is a schematic side sectional view of the acousto-optic element 100, taken along line I-I' of FIG. 1.

Referring to FIGS. 1 and 2, the acousto-optic element 100 of the embodiment may include an acousto-optic modulation unit 110 provided on a substrate 117, a light supply unit 130 configured to supply light to the acousto-optic modulation unit 110, a first sound-wave modulation unit 150 configured to apply first elastic waves $A_H$ to the acousto-optic modulation unit 110, and a second sound-wave modulation unit 170 configured to apply second elastic waves $A_V$ to the acousto-optic modulation unit 110.

The acousto-optic modulation unit 110 may include a core layer 111, a first cladding layer 112 disposed on a lower surface of the core layer 111, and a second cladding layer 113 disposed on an upper surface of the core layer 111. The core layer 111 may have a refractive index greater than those of the first and second cladding layers 112 and 113. At least one of the first and second cladding layers 112 and 113 may be an air or vacuum layer. In this case, at least one of the first and second cladding layers 112 and 113 may be omitted.

A reflection layer 115 may be further provided on a lower side of the first cladding layer 112. The reflection layer 115 may be formed of a metal such as aluminum (Al) or silver (Ag). When light is incident on the acousto-optic modulation unit 110 and exit from the acousto-optic modulation unit 110 after being modulated, downwardly propagating light may be reflected to an upper side by the reflection layer 115.

At least one of the core layer 111, the first cladding layer 112, and the second cladding layer 113 may be formed of an acousto-optic material having the acousto-optic effect. In this case, if sound waves are applied to the acousto-optic modulation unit 110, the density of the acousto-optic modulation unit 110 may be locally varied in a periodic manner according to the compression and rarefaction of the sound waves. Examples of the acousto-optic material include ZnO, $LiNbO_3$, $LiTaO_3$, quartz, $TiO_2$, Si, SiN, AlN, $SiO_2$, and $SrTiO_3$.

The acousto-optic modulation unit 110 has at least three sides (first to third sides 110a, 110b, and 110c). For example, as shown in FIG. 1, the acousto-optic modulation unit 110 may have four sides (that is, a rectangular shape when viewed from the topside).

The light supply unit 130 is disposed at the first side 110a of the acousto-optic modulation unit 110 to supply light L in a first direction. The light supply unit 130 may include an optical coupler 135.

An optical waveguide 131 may extend along the first side 110a of the acousto-optic modulation unit 110 to transmit light emitted from a light source (not shown), and the optical coupler 135 may be disposed at the first side 110a of the acousto-optic modulation unit 110 to couple light transmitted through the optical waveguide 131 to the core layer 111 of the acousto-optic modulation unit 110. For example, as shown in FIG. 2, the second cladding layer 113 may have a stepped portion on the first side 110a of the acousto-optic modulation unit 110 to partially expose the core layer 111. The optical waveguide 131 may be disposed between a stepped side surface 113a of the second cladding layer 113 and an exposed top surface region of the core layer 111 so that the optical waveguide 131 may make contact with the top surface of the core layer 111 of the acousto-optic modulation unit 110. The optical coupler 135 may be a grating coupler formed in the optical waveguide 131 disposed on the exposed top surface region of the core layer 111. For example, the grating coupler may be a grating pattern formed in the optical waveguide 131 by using materials having different refractive indexes. In another example, the grating coupler may be a groove grating pattern formed between the optical waveguide 131 and the core layer 111. In FIG. 1, the incident direction of light L is a positive (+) V-axis direction. However, the incident direction of light L is not limited thereto. According to the coupling method of the optical coupler 135, a first direction may be an oblique direction from the light supply unit 130 to the first side 110a of the acousto-optic modulation unit 110.

The first sound-wave modulation unit 150 may include a first sound-wave generator 151 disposed at the second side 110b of the acousto-optic modulation unit 110 to generate first elastic waves $A_H$ in a second direction and a first high-frequency waveguide 155 to apply first high-frequency power to the first sound-wave generator 151. Similarly, the second sound-wave modulation unit 170 may include a second sound-wave generator 171 disposed at the third side 110c of the acousto-optic modulation unit 110 to generate second elastic waves $A_V$ in a third direction and a second high-frequency waveguide 175 to apply second high-frequency power to the second sound-wave generator 171. The first and second directions are different from the first direction in which light is incident. For example, as shown in FIG. 1, the second direction may be a negative (−) H-axis direction, and the third direction may be a negative (−) V-axis direction. The first and second sound-wave modulation units 150 and 170 may include an earth wire or common wire for the first and second sound-wave generators 151 and 171.

For example, the first and second sound-wave generators 151 and 171 may be electro-acoustic modulators capable of generating surface acoustic waves (SAWs) or bulk acoustic waves (BAWs). The first and second sound-wave generators 151 and 171 may be disposed in one or more of the core layer 111, the first cladding layer 112, the second cladding layer 113, the reflection layer 115, and the substrate 117 or may be disposed therebetween. In addition, the first and second high-frequency waveguides 155 and 175 may be provided in different layers so that the first and second high-frequency waveguides 155 and 175 may be arranged in a crossing manner in an array (described later) of such acousto-optic elements 100.

A first sound absorbing member 159 is disposed outside the first sound-wave generator 151, and a second sound absorbing member 179 is disposed outside the second sound-wave generator 171. The first and second sound absorbing members 159 and 179 are used to prevent first and second elastic waves $A_H$ and $A_V$ generated by the first and second sound-wave generators 151 and 171 from propagating outward. Therefore, when an array is formed of such acousto-optic elements 100 of the current embodiment, interference between neighboring acousto-optic elements 100 may be prevented. In a related art, natural acousto-optic materials have limited acousto-optic conversion efficiency. In contrast, in the current embodiment, the acousto-optic element 100 may have a photonic crystal structure for obtaining a wider diffraction angle range by the acousto-optic effect. In the current embodiment, the core layer 111 may have a 2-dimensional or 3-dimensional periodic photonic crystal structure. Photonic crystals may be defined as a periodic structure in which at least two materials having different dielectric constants (or refractive indexes) are periodically arranged. For example, photonic crystals may be a periodic structure having a submicron size period, that is, a size period of several nanometers to several hundreds of nanometers (for example, a size period equal to or less than wavelengths). Such photonic crystals may transmit, reflect, or absorb almost 100% of light having a particular wavelength band. A light wavelength band not passing through photonic crystals is known as a photonic bandgap. Photonic crystals having such a photonic bandgap are used in various fields.

Figure 3:
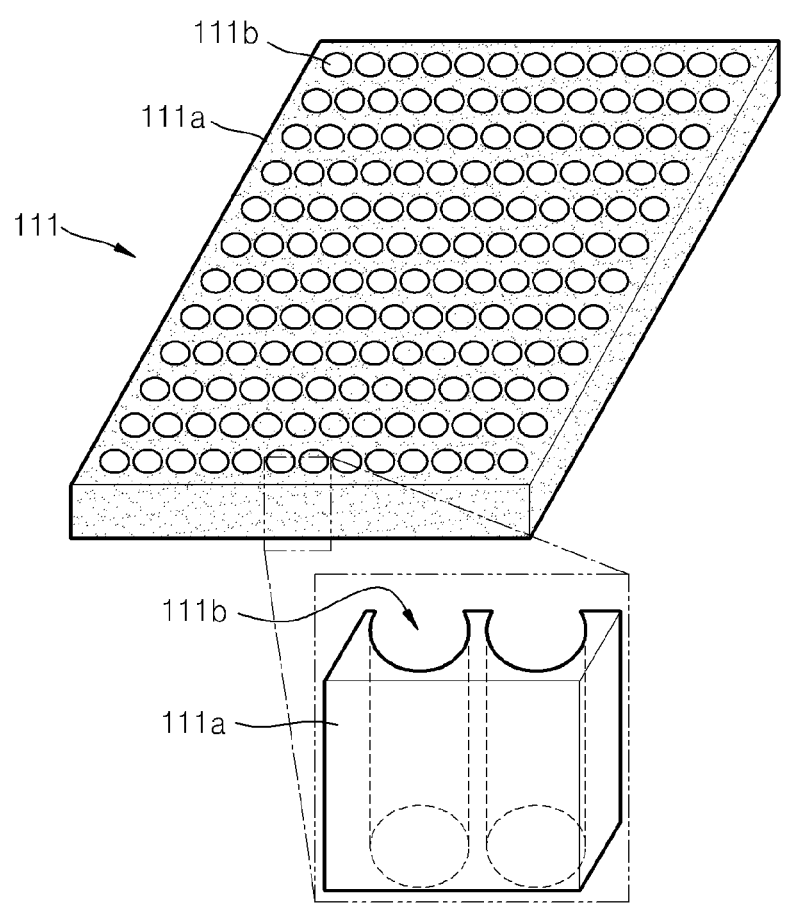
FIG. 3 is a schematic perspective view illustrating an exemplary photonic crystal structure of a core layer of the acousto-optic element of FIG. 1.

FIG. 3 is a schematic perspective view illustrating an exemplary photonic crystal structure of the core layer 111 of the acousto-optic modulation unit 110 according to the embodiment. Referring to FIG. 3, the core layer 111 may include a dielectric substrate 111a and a plurality of holes 111b vertically formed in the dielectric substrate 111a. For example, if the core layer 111 is formed of an acousto-optic material, the dielectric substrate 111a may be the acousto-optic material. In the example shown in FIG. 3, the plurality of holes 111b vertically penetrate the dielectric substrate 111a. However, the plurality of holes 111b may not penetrate the dielectric substrate 111a. Air may be simply filled in the holes 111b, or a dielectric material having a refractive index different from that of the dielectric substrate 111a may be filled in the holes 111b. In addition, the holes 111b may be arranged in a periodic structure in which unit cells having rectangular patterns are repeated. In the example shown in FIG. 3, the holes 111b have a circular cylinder shape. However, the holes 111b may have a rectangular cylinder shape or any other polygonal cylinder shape.

In the photonic crystal structure shown in FIG. 3, a repetitive pattern may be directional. Thus, refractive index distribution by the photonic crystal structure may be anisotropic. Because of such anisotropic refractive index distribution, an equifrequency contour 207 (refer to FIG. 5) of optical wave vectors in a photonic crystal region of the acousto-optic modulation unit 110 may be flat in the first and second directions.

The photonic crystal structure of the core layer 111 shown in FIG. 3 is an example. That is, the photonic crystal structure of the core layer 111 may be variously designed. Various periodic structures other than the periodic structure shown in FIG. 3 may be used. For example, instead of the vertical holes 111b, hexahedral or spherical dielectric parts may be periodically arranged in the dielectric substrate 111a. Although the photonic crystal structure shown in FIG. 3 is 2-dimensional, the core layer 111 may have a 3-dimensional photonic crystal structure (that is, a photonic crystal structure having periodicity in the length, width, and height directions thereof). As described above, the photonic crystal structure of the core layer 111 may be variously designed according to a required equifrequency contour of optical wave vectors.

In addition, the first and second cladding layers 112 and 113 may have the same photonic crystal structure as that of the core layer 111. In some embodiments, however, only the core layer 111 may have a photonic crystal structure, and the first and second cladding layers 112 and 113 may not have a photonic crystal structure.

Figure 4:
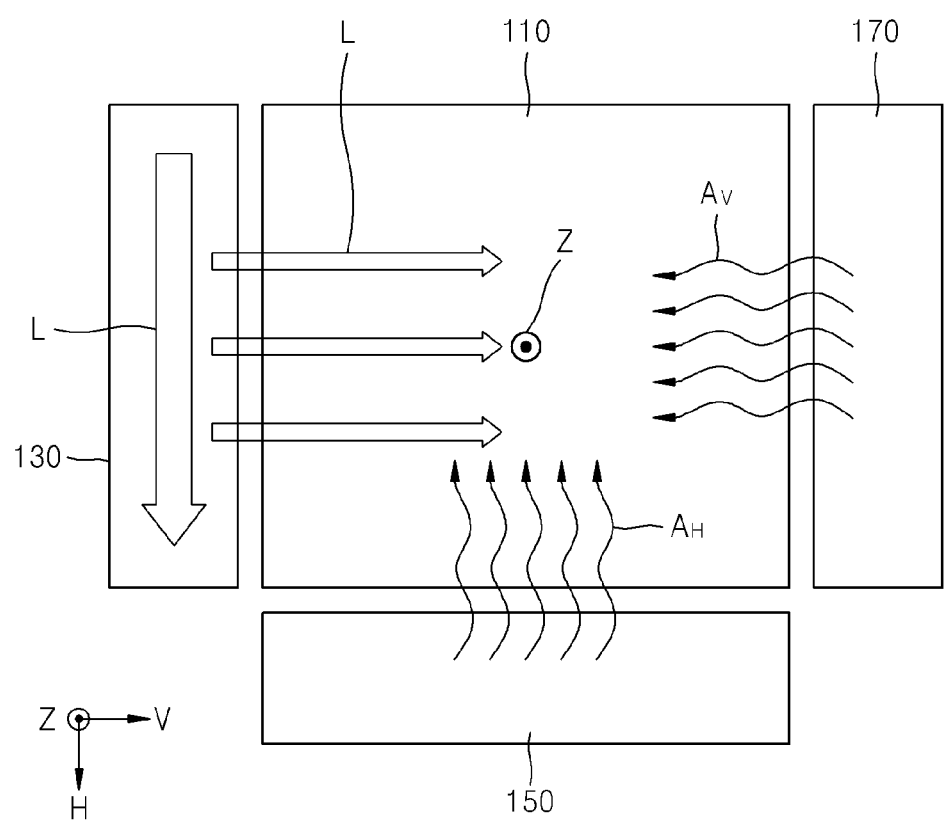
FIG. 4 is a view for explaining an operation of the acousto-optic element of FIG. 1.
Figure 5:
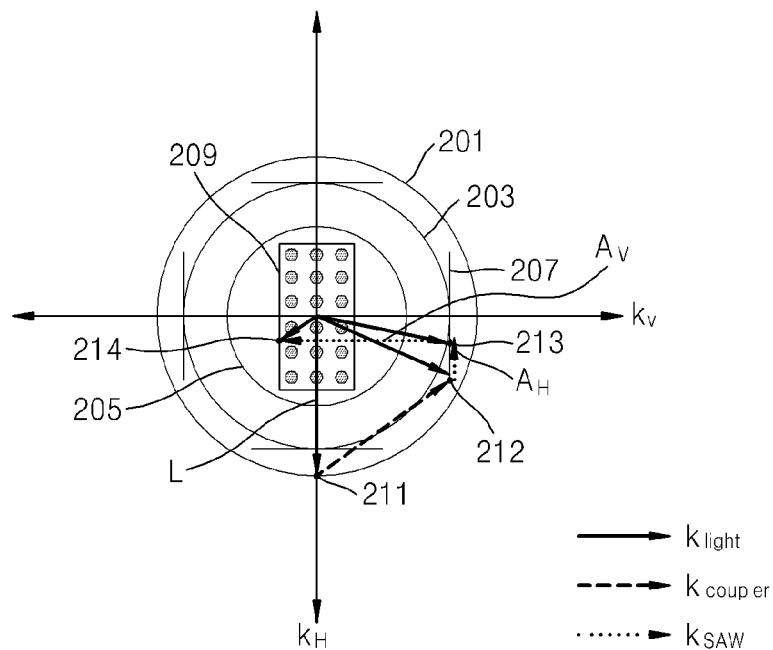
FIG. 5 is a view illustrating light propagation directions in the acousto-optic element of FIG. 1 by using a wavenumber space.
Figure 6:
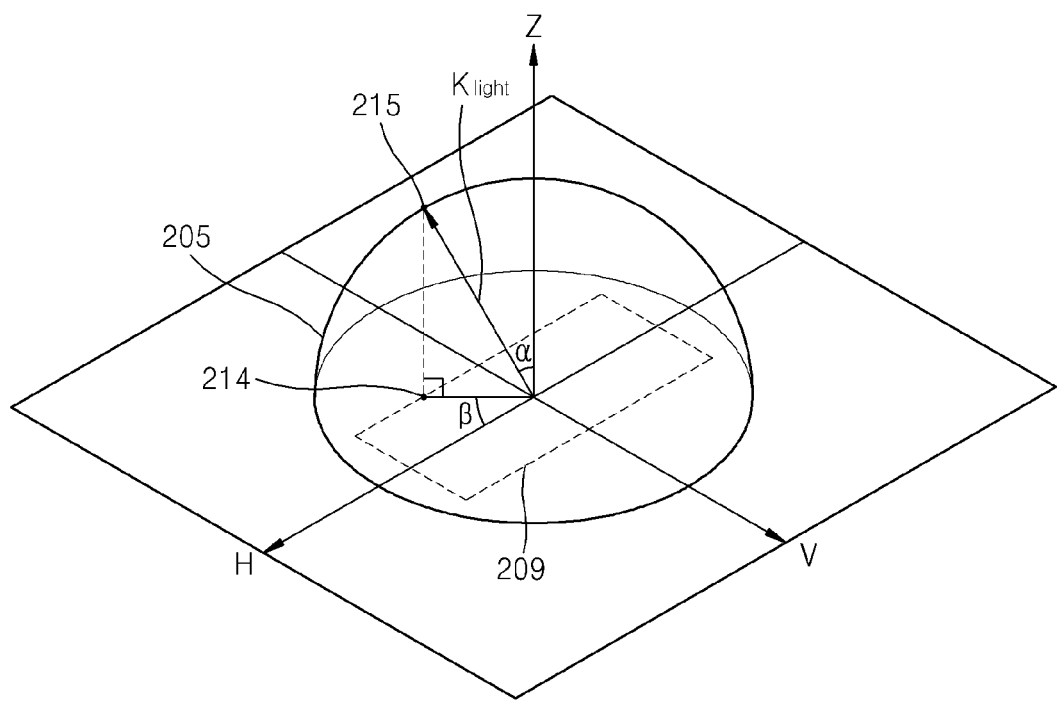
FIG. 6 is a real-space view illustrating propagation directions of the light output from the acousto-optic element of FIG. 1.

FIG. 4 is a view for explaining an operation of the acousto-optic element 100 according to the embodiment, FIG. 5 is a view illustrating light propagation directions in the acousto-optic element 100 by using a wavenumber space, and FIG. 6 is a real-space view illustrating propagation directions of light output from the acousto-optic element 100.

Referring to FIG. 4, light L propagates through the optical waveguide 131 of the light supply unit 130 and enters the acousto-optic modulation unit 110 through the optical coupler 135 (refer to FIGS. 1 and 2). The light L is incident on the acousto-optic modulation unit 110 in a first direction (for example, a positive (+) V-axis direction or a direction making an acute angle therewith) and is diffracted and deflected by the acousto-optic effect caused by first elastic waves $A_H$ generated in a second direction (for example, a negative (−) H-axis direction) by the first sound-wave modulation unit 150 and second elastic waves $A_V$ generated in a third direction (for example, a negative (−) V-axis direction) by the second sound-wave modulation unit 170. Then, the light L exits from the acousto-optic modulation unit 110.

Deflection of light L by the acousto-optic effect of first and second elastic waves $A_H$ and $A_V$ may be understood more clearly by referring to the wavenumber space shown in FIG. 5.

Referring to FIG. 5, light L in the optical waveguide 131 has a wave vector $k_H$. Reference numeral 201 denotes an equifrequency contour of wave vectors that the light L may have in the optical waveguide 131, and reference numeral 211 denotes the tip of the wave vector $k_H$ of the light L in the optical waveguide 131. The light L is incident on the acousto-optic modulation unit 110 from the optical waveguide 131 by the optical coupler 135. This may be understood that the wave vector $k_H$ of the light L in the optical waveguide 131 is changed in direction by a wave vector $k_{coupler}$ resulting from the optical coupler 135. That is, when the origin of the wave vector $k_H$ of the light L is on the origin of the wavenumber space, the tip of the wave vector $k_H$ is changed from a point 211 to a point 212 by the optical coupler 135. Reference numeral 203 denotes an equifrequency contour of wave vectors that the light L may have in the first and second cladding layers 112 and 113. Since the core layer 111 has a refractive index greater than those of the first and second cladding layers 112 and 113, an equifrequency contour of wave vectors that the light L may have in the core layer 111 may be outside of the equifrequency contour 203 in the first and second cladding layers 112 and 113.

Since the acousto-optic modulation unit 110 has the photonic crystal structure, the equifrequency contour 207 of wave vectors that the light L may have in the photonic crystal structure may be flat in the first and second directions. In this way, since wave vectors that the light L may have in the photonic crystal structure of the acousto-optic modulation unit 110 are limited, the tip of the wave vector of the light L is changed from the point 212 to a point 213 in the acousto-optic modulation unit 110 by first elastic waves $A_H$. In addition, the tip of the wave vector of the light L is changed from the point 213 to a point 214 in the acousto-optic modulation unit 110 by second elastic waves $A_V$. Since wave vectors that the light L may have in the photonic crystal structure of the acousto-optic modulation unit 110 are limited by the equifrequency contour 207, a wave vector having a tip at the point 214 may not exist in the wavenumber space shown in FIG. 5. Thus, the wave vector exits upward from the plane of the wavenumber space shown in FIG. 5.

In FIGS. 5 and 6, reference numeral 209 denotes a window that may be considered an exit window through which light exits upward from the acousto-optic modulation unit 110. Reference numeral 205 denotes an equifrequency contour of wave vectors that the light L may have in air. That is, the tip of the wave vector of the light L in air is at a point of the equifrequency contour 205. That is, the wave vector having a tip at the point 214 in FIG. 5 may be considered as a projection of a wave vector $k_{light}$ having a tip at a point 215 in FIG. 6. In other words, the point 214 in the wavenumber space indicates light L propagating in a particular direction in a 3-dimensional space.

Since the point 214 in the wavenumber space may be determined by design factors such as the direction of light L incident on the acousto-optic modulation unit 110, the intensities and directions of first and second elastic waves $A_H$ and $A_V$, and the refractive index of the acousto-optic modulation unit 110, the direction of light L output from the acousto-optic element 100 may be adjusted by varying such design factors.

For example, if the direction of light L incident on the acousto-optic modulation unit 110, the directions of first and second elastic waves $A_H$ and $A_V$, and the refractive index of the acousto-optic modulation unit 110 are regulated by design specifications, the frequencies of the first and second elastic waves $A_H$ and $A_V$ may be varied and the amplitudes and phases of the first and second elastic waves $A_H$ and $A_V$ may be varied according to the frequencies thereof, so as to adjust the direction of light L exiting upward from the acousto-optic modulation unit 110. The direction of light L exiting upward from the acousto-optic modulation unit 110 may be expressed by a zenith angle α and an azimuthal angle β. The frequencies and the amplitudes and phases by frequency of the first and second elastic waves $A_H$ and $A_V$ may be determined by the frequencies and the amplitudes and phases by frequency of first and second high-frequency powers applied to the first and second sound-wave generators 151 and 171. Therefore, the direction of light L output from the acousto-optic element 100 may be adjusted by varying first and second high-frequency powers to the first and second sound-wave generators 151 and 171. In other words, light L output from the acousto-optic element 100 may be used for horizontal scanning by adjusting the frequency and the amplitude and phase by frequency of first high-frequency power, and light L output form the acousto-optic element 100 may be used for vertical scanning by adjusting the frequency and the amplitude and phase by frequency of second high-frequency power. That is, the first and second high-frequency waveguides 155 and 175 may be considered as horizontal and vertical scanning lines of an optical scanner or display panel.

The above-described acousto-optic element 100 may be used in various fields. For example, the acousto-optic element 100 may be used in a 2-dimensional scanner for scanning with light L in horizontal and vertical directions. As described above, since the acousto-optic modulation unit 110 has the photonic crystal structure, a large diffraction angle may be obtained for increasing the operational range (scanning range) of an optical scanner. Thus, the structures of optical systems used in the optical scanner may be simplified. In particular, an additional optical system may not be used for increasing the range of a diffraction angle.

As described above, deflection by the acousto-optic effect may be understood as diffraction of light L in an acousto-optic medium whose local density is repeatedly varied by elastic waves. That is, the intensity of zeroth order diffraction light may be adjusted based on the amount of diffraction varying according to the frequency and intensity-by-frequency of elastic waves. Thus, the acousto-optic element 100 of the current embodiment may be used as an optical modulator for zeroth order diffraction light. In addition, when light L is diffracted using the acousto-optic element 100 by applying elastic waves, since other diffraction light components such as +1st or −1st order diffraction light are generated, zeroth order diffraction light passing through the acousto-optic element 100 may be weakened. In addition, if other diffraction light components such as first order diffraction light have more energy according to diffraction conditions, zeroth order diffraction light may be further weakened. Therefore, the acousto-optic element 100 may function as an optical modulator capable of amplitude modulation. Further, the phase of light L may also be controlled by adjusting the propagation path or diffraction amount of the light L in the acousto-optic element 100 so as to use the acousto-optic element 100 as an optical modulator capable of phase modulation. In addition, the shape (wave pattern) of light L output from the acousto-optic element 100 may also be controlled by adjusting the frequency and the intensity and phase by frequency of elastic waves.

In the current embodiment, the core layer 111 has a refractive index greater than those of the first and second cladding layers 112 and 113. However, this is a non-limiting example. For example, the relationship among the refractive indexes of the core layer 111 and the first and second cladding layers 112 and 113 may be relaxed as long as the refractive index of the core layer 111 is different from those of the first and second cladding layers 112 and 113, for the case in which the reflection layer 115 is disposed on the lower side of the first cladding layer 112, the case in which some of the core layer 111 and the first and second cladding layers 112 and 113 have photonic crystal structures or meta-material structures, and other cases.

In the above-described embodiment, the acousto-optic element 100 has a photonic crystal structure for increasing the acousto-optic effect. However, the embodiments are not limited thereto. For example, the core layer 111 or the first and second cladding layers 112 and 113 of the acousto-optic modulation unit 110 may be formed of a meta material having a plasmonic structure formed by a conductive material and a dielectric material. Meta materials are materials having refraction characteristics that are not found in nature. In other words, metal materials are artificial atomic units including various patterns having subwavelength sizes. It is known that meta materials result in new phenomena such as subwavelength focusing, negative refraction, extraordinary transmission, and invisible cloaking for electromagnetic waves, sound waves, or ultrasonic waves. The above-mentioned photonic crystals and plasmonic structure may be understood as examples of metal materials. If large diffraction is not necessary, such structures for increasing the acousto-optic effect may not be used.

In FIG. 2, the second sound-wave generator 171 of the second sound-wave modulation unit 170 is disposed in the reflection layer 115. However, the second sound-wave generator 171 of the second sound-wave modulation unit 170 may be disposed in the core layer 111, the first cladding layer 112, or the second cladding layer 113. Similarly, the first sound-wave generator 151 of the first sound-wave modulation unit 150 may be disposed in one of the core layer 111, the first cladding layer 112, the second cladding layer 113, and the reflection layer 115. In another example, the first and second sound-wave generators 151 and 171 of the first and second sound-wave modulation units 150 and 170 may be disposed on interfaces among the core layer 111, the first cladding layer 112, the second cladding layer 113, the reflection layer 115, and the substrate 117. In addition, the first and second sound-wave generators 151 and 171 of the first and second sound-wave modulation units 150 and 170 may be disposed in different layers or the same layer.

In the above-described embodiment, the first and second sound-wave modulation units 150 and 170 are disposed at the second and third sides 110b and 110c of the acousto-optic modulation unit 110 to generate sound waves. However, the embodiments are not limited thereto. For example, at least two of the core layer 111, the first cladding layer 112, the second cladding layer 113, the reflection layer 115, and the substrate 117 may be formed of piezoelectric materials (such as ZnO, PZT, $LiNbO_3$, $LiTaO_3$, quartz, and $SrTiO_3$), and may function as the first and second sound-wave modulation units 150 and 170. For example, if the first cladding layer 112 is formed of a piezoelectric material, a voltage may be applied to the first cladding layer 112 to vibrate the first cladding layer 112. Thus, elastic waves are generated by the vibration of the first cladding layer 112. Since the direction of elastic waves is determined by the arrangement of electrodes which apply a voltage to a piezoelectric material or the crystalline direction of the piezoelectric material, the piezoelectric material may generate elastic waves in the second direction (negative (−) H-axis direction) or the third direction (negative (−) V-axis direction). In an exemplary configuration, one of the core layer 111, the first cladding layer 112, the second cladding layer 113, the reflection layer 115, and the substrate 117 may be formed of a piezoelectric material to function as the first sound-wave modulation unit 150, and a separate sound-wave generator disposed at a side of the acousto-optic modulation unit 110 may function as the second sound-wave modulation unit 170. In another example, a configuration opposite to the exemplary configuration may be used.

Furthermore, in the above-described embodiment, it seems that the acousto-optic modulation unit 110 is spatially separated from the light supply unit 130 and the first and second sound-wave modulation units 150 and 170. However, some layers of the acousto-optic modulation unit 110 (such as the core layer 111 or the first cladding layer 112) may extend outward from the region of the acousto-optic modulation unit 110. In this case, the acousto-optic modulation unit 110 may be considered as a region surrounded by the light supply unit 130 and the first and second sound-wave modulation units 150 and 170. Furthermore, in the above-described embodiment, the photonic crystal structure may be considered to be formed in a region of the acousto-optic modulation unit 110 surrounded by the light supply unit 130 and the first and second sound-wave modulation units 150 and 170.

In the above-described embodiment, a grating coupler is described as the optical coupler 135. However, any other optical coupling device known in the art may be used as the optical coupler 135. For example, a lens or prism may be disposed between the optical waveguide 131 and the core layer 111. In another example, the optical waveguide 131 of the light supply unit 130 and the core layer 111 may be in contact with each other without using the optical coupler 135. In another example, the optical coupler 135 may be formed by arranging semi-transparent reflection layers at an oblique angle in the optical waveguide 131 disposed on the exposed top region of the core layer 111.

Further more, in the above-described embodiment, the light supply unit 130 is constituted by the optical waveguide 131 and the optical coupler 135. However, the embodiments are not limited thereto. For example, the light supply unit 130 may be a light source disposed at the first side 110a of the acousto-optic modulation unit 110.

In the above-described embodiment, the arrangement of the light supply unit 130, the first sound-wave modulation unit 150, and the second sound-wave modulation unit 170 is exemplary. That is, the embodiments are not limited thereto. As long as the first direction in which light L is incident on the acousto-optic modulation unit 110, the second direction in which first elastic waves $A_H$ are generated by the first sound-wave modulation unit 150, and the third direction in which second elastic waves $A_V$ are generated by the second sound-wave modulation unit 170 are different, the light L incident on the acousto-optic modulation unit 110 may be deflected toward the window 209 (refer to FIG. 5) by adjusting the amplitudes and phases of the first and second elastic waves $A_H$ and $A_V$ so that the light L may exit from the acousto-optic modulation unit 110 through the window 209.

Figure 7:
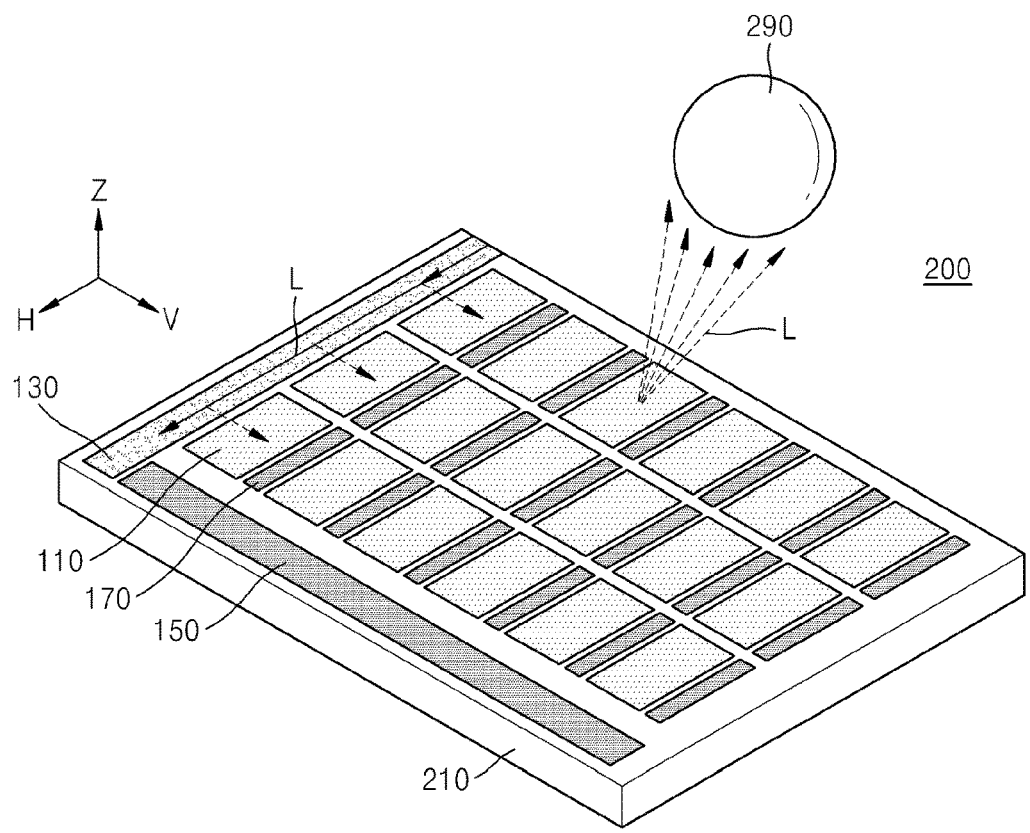
FIG. 7 is a schematic plan view illustrating an acousto-optic element array according to according to an embodiment.
Figure 8:
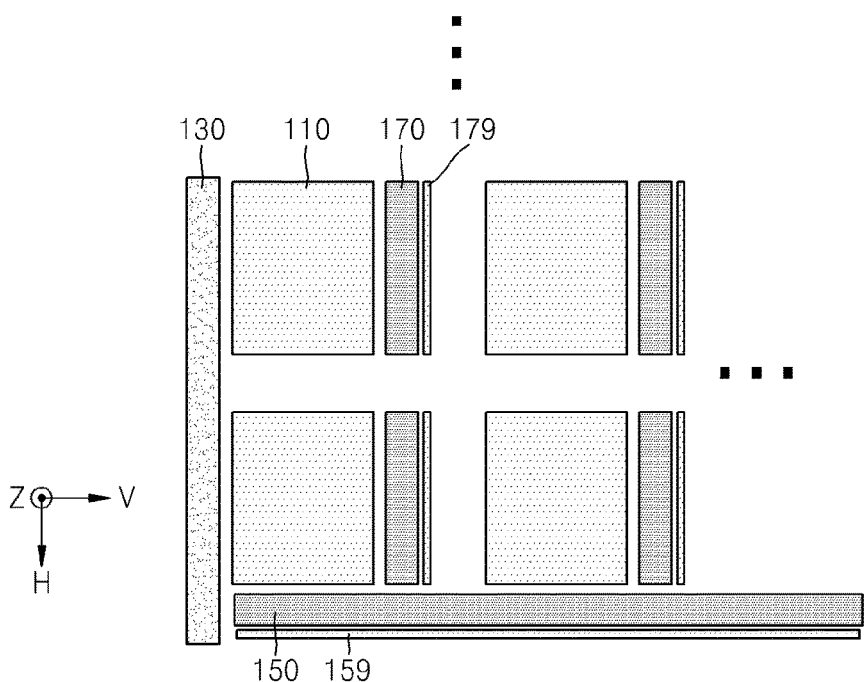
FIG. 8 is a view illustrating an exemplary arrangement of a light supply unit and first and second sound wave generators in the acousto-optic element array of FIG. 7.

FIG. 7 is a schematic plan view illustrating an acousto-optic element array 200 according to according to an embodiment, and FIG. 8 is a view illustrating an exemplary arrangement of a light supply unit 130 and first and second sound-wave modulation units 150 and 170 in the acousto-optic element array 200.

Referring to FIGS. 7 and 8, the acousto-optic element array 200 of the embodiment includes acousto-optic modulation units 110 2-dimensionally arranged on a substrate 210, a light supply unit 130 configured to supply light to the acousto-optic modulation units 110, a first sound-wave modulation unit 150 configured to generate first elastic waves $A_H$ toward the acousto-optic modulation units 110, and second sound-wave modulation units 170 configured to generate second elastic waves $A_V$ toward the acousto-optic modulation units 110. The substrate 210 may have a flat or curved surface.

The acousto-optic modulation units 110 are arranged in a plurality of columns and a plurality of rows. The 2-dimensional arrangement of the acousto-optic modulation units 110 may be understood as a matrix arrangement of pixels in a display panel. A core layers 111 (refer to FIG. 2) and a first cladding layer 112 (refer to FIG. 2) of the acousto-optic modulation units 110 may extend outward from the acousto-optic modulation units 110 and cover the entire region of the substrate 210. The acousto-optic modulation units 110 may be within an inner region surrounded by the light supply unit 130 and the first and second sound-wave modulation units 150 and 170, and photonic crystal structures may only be formed in the inner region.

The light supply unit 130 extends along an outer side of one of the outermost columns of the arrangement of the acousto-optic modulation units 110. In detail, a optical waveguide 131 (refer to FIG. 1) of the light supply unit 130 extends along the outer side of one of the outermost columns of the arrangement of the acousto-optic modulation units 110, and optical couplers 135 (refer to FIG. 1) are disposed between the optical waveguide 131 and the acousto-optic modulation units 110 to direct light from the optical waveguide 131 to the acousto-optic modulation units 110.

The first sound-wave modulation unit 150 may extend along an outer side of one of the outermost rows of the arrangement of the acousto-optic modulation units 110. As shown in FIG. 8, a first sound absorbing member 159 may also extend along the outer side of one of the outermost rows of the arrangement of the acousto-optic modulation units 110.

The second sound-wave modulation units 170 may be individually disposed on sides of the acousto-optic modulation units 110. As shown in FIG. 8, second sound absorbing members 179 may also be individually disposed together with the second sound-wave modulation units 170.

As described above, the acousto-optic modulation units 110, the light supply unit 130, and the first and second sound-wave modulation units 150 and 170 may be disposed on the flat substrate 210 so that the acousto-optic element array 200 may be used as a flat panel.

Next, an exemplary operation of the acousto-optic element array 200 will be described.

Referring to FIG. 7, the light supply unit 130 may simultaneously supply light to the one of the outermost columns of the acousto-optic modulation units 110 in a first direction (a positive (+) V-axis direction or a direction making an acute angle therewith). In addition, as described above, since the core layer 111 and the first cladding layer 112 of the acousto-optic modulation units 110 extend outward from the acousto-optic modulation units 110 and cover the entire region of the substrate 210, the light incident on the one of the outermost column of the acousto-optic modulation units 110 may propagate all over the substrate 210 through the core layer 111. That is, the light supply unit 130 may be commonly used for the acousto-optic modulation units 110.

Similarly, the first sound-wave modulation unit 150 may simultaneously apply first elastic waves to the one of the outermost rows of the acousto-optic modulation units 110 in a second direction (for example, a negative (−) H-axis direction). No sound absorbing member is disposed between the first sound-wave modulation unit 150 and the acousto-optic modulation units 110 in the second direction. Thus, the first elastic waves may propagate through the acousto-optic modulation units 110 in the second direction. That is, the first sound-wave modulation unit 150 may also be commonly used for the acousto-optic modulation units 110.

Since the second sound-wave modulation units 170 are respectively provided for the acousto-optic modulation units 110, the second sound-wave modulation units 170 individually apply second elastic waves to the acousto-optic modulation units 110. Since the second sound absorbing members 179 are individually provided for the acousto-optic modulation units 110 together with the second sound-wave modulation units 170, noises caused by second elastic waves of neighboring acousto-optic modulation units 110 may be removed by the second sound absorbing members 179.

In the acousto-optic element array 200, all the acousto-optic modulation units 110 share the light supply unit 130 and the first sound-wave modulation unit 150, and the direction of light L output from the acousto-optic modulation units 110 may be adjusted by varying second elastic waves generated by the second sound-wave modulation units 170. In other words, horizontal scanning may be performed by commonly using the acousto-optic modulation units 110 (i.e., pixels), and vertical scanning may be performed by individually using the acousto-optic modulation units 110 (i.e., pixels).

As described above, light L incident on the acousto-optic modulation units 110 may be diffracted by first and second elastic waves generated by the first and second sound-wave modulation units 150 and 170 and may be output upward, and the direction and shape of the output light L may be controlled by varying the frequencies and the amplitudes and phases by frequency of the first and second elastic waves. Therefore, the acousto-optic element array 200 of the current embodiment may function as a multi-directional surface light source capable of emitting light L toward a plurality of visual fields.

In addition, according to the current embodiment, the intensity of light L output from the acousto-optic element array 200 may be adjusted by varying the amplitudes and phases of first and second elastic waves. Thus, the acousto-optic element array 200 may function as a 2-dimensional display panel. Furthermore, according to the current embodiment, the intensity and direction of light L output from the acousto-optic element array 200 may be simultaneously adjusted by varying the frequencies and the amplitudes and phases by frequency of first and second elastic waves. Thus, the acousto-optic element array 200 may function as a multi-directional, 3-dimensional display panel capable of providing multiple viewpoints. Furthermore, since the acousto-optic element array 200 of the current embodiment may function as an optical modulator capable of phase modulation, the acousto-optic element array 200 may be used as a hologram panel capable of providing holographic images by supplying computer generated holograms (CGHs) to the first and second sound-wave modulation units 150 and 170 as electric signals. Furthermore, the acousto-optic element array 200 of the current embodiment may provide optical controlling for optical interconnection.

Figure 9A:
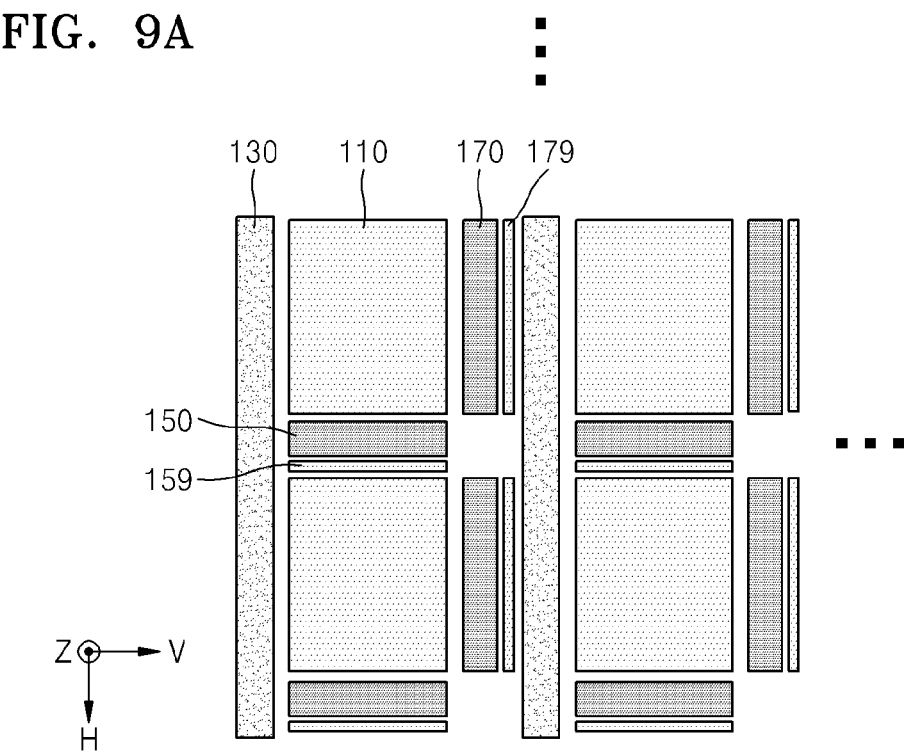
FIGS. 9A to 9H are views illustrating exemplary arrangements of light supply units and first and second sound-wave modulation units in acousto-optic element arrays according to embodiments.

The arrangement of the light supply unit 130, the first and second sound-wave modulation units 150 and 170 shown in the current embodiment is an exemplary one. Various other arrangements may be used. FIGS. 9A to 9A are views illustrating exemplary arrangements of light supply units 130 and first and second sound-wave modulation units 150 and 170 that may be applied to the acousto-optic element array 200 of FIG. 7.

For example, referring to FIG. 9A, light supply units 130 may extend along sides of a plurality of columns of arrayed acousto-optic modulation units 110, and first and second sound-wave modulation units 150 and 170 may be individually provided for the respective acousto-optic modulation units 110.

Figure 9B:
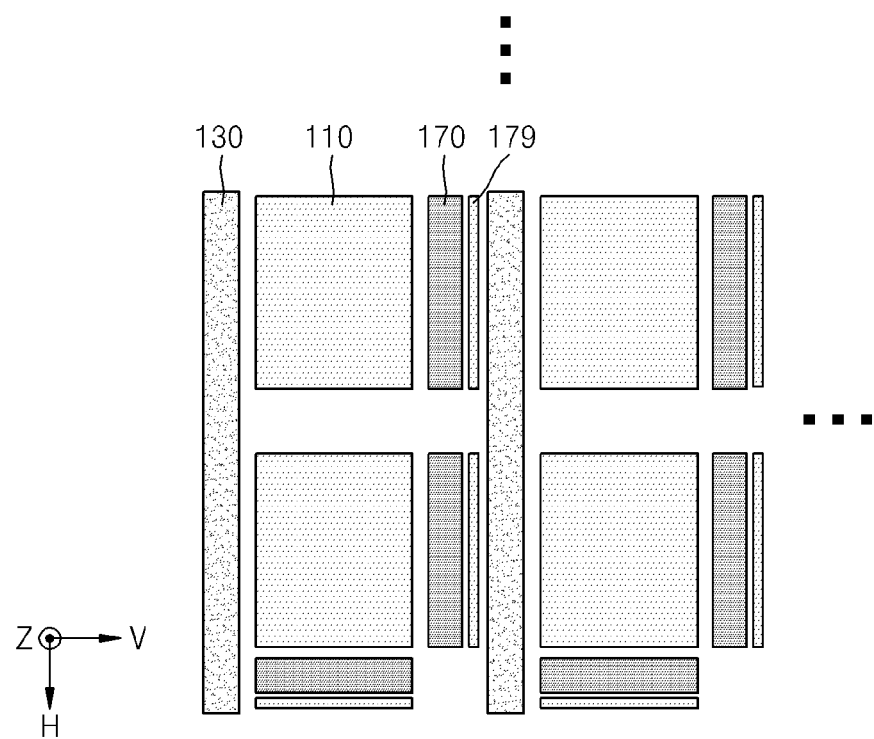

In another example shown in FIG. 9B, light supply units 130 may extend along sides of a plurality of columns of arrayed acousto-optic modulation units 110, first sound-wave modulation units 150 may be individually provided at rear ends of columns of the acousto-optic modulation units 110, and second sound-wave modulation units 170 may be provided for the respective acousto-optic modulation units 110. In this case, the light supply units 130 may be commonly used for all the acousto-optic modulation units 110, and the first sound-wave modulation units 150 may be commonly used for the columns of the acousto-optic modulation units 110, respectively.

Figure 9C:
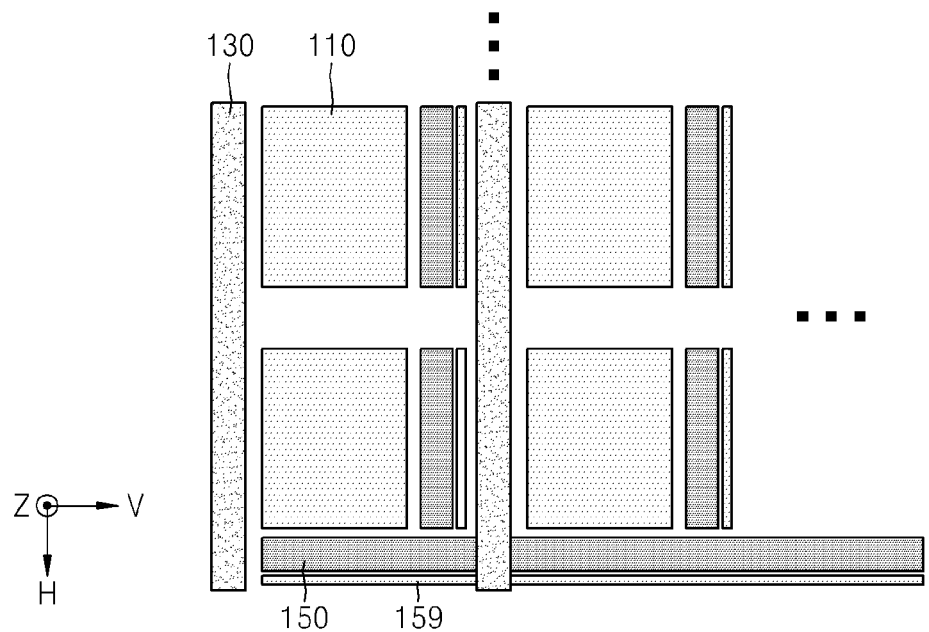

In another example shown in FIG. 9C, light supply units 130 may extend along sides of a plurality of columns of arrayed acousto-optic modulation units 110, a first sound-wave modulation unit 150 may extend along an outer side of one of the outermost rows of the arrayed acousto-optic modulation units 110, and second sound-wave modulation units 170 may be provided for the acousto-optic modulation units 110, respectively. In this case, the light supply units 130 and the first sound-wave modulation unit 150 may be commonly used for all the acousto-optic modulation units 110.

Figure 9D:
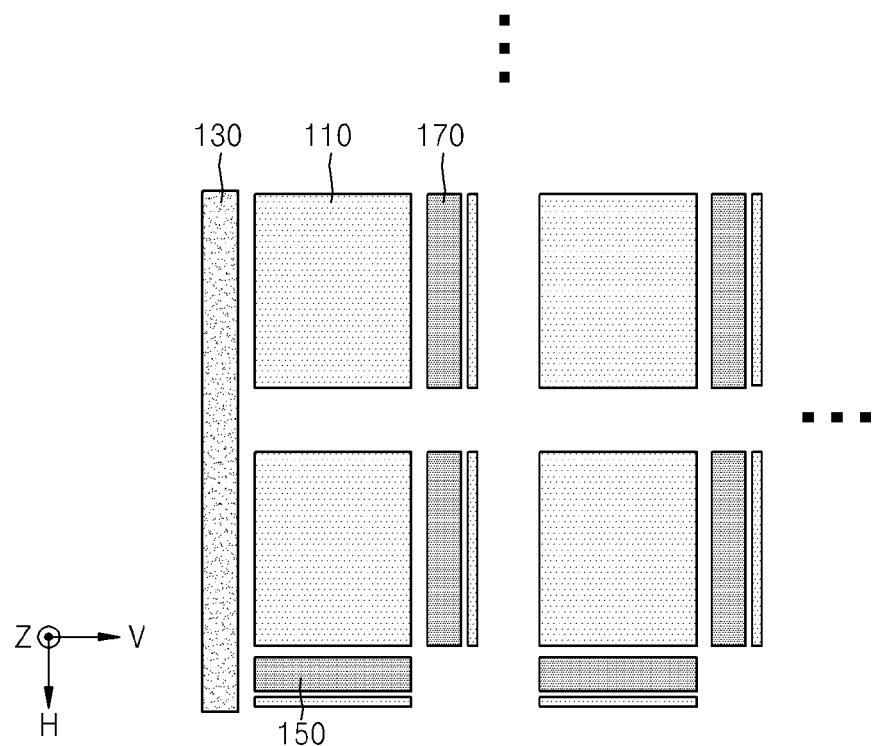

In another example shown in FIG. 9D, a light supply unit 130 may extend along an outer side of one of the outermost columns of arrayed acousto-optic modulation units 110, first sound-wave modulation units 150 may be individually provided at rear ends of columns of the acousto-optic modulation units 110, and second sound-wave modulation units 170 may be provided for the acousto-optic modulation units 110, respectively.

Figure 9E:
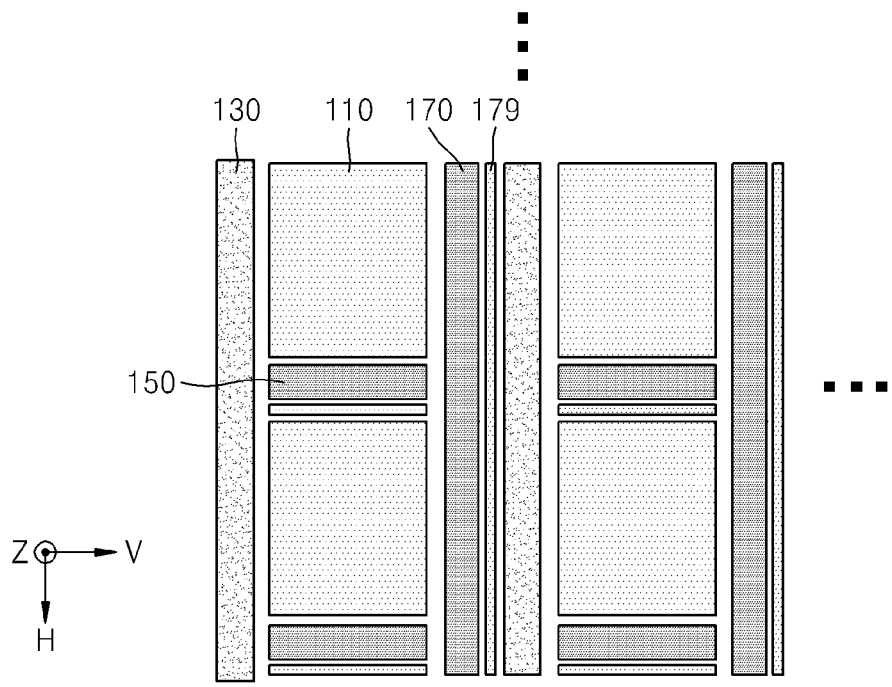

In another example shown in FIG. 9E, light supply units 130 and second sound-wave modulation units 170 may extend along both sides of a plurality of columns of arrayed acousto-optic modulation units 110, and first sound-wave modulation units 150 may be individually provided for the acousto-optic modulation units 110, respectively.

Figure 9F:
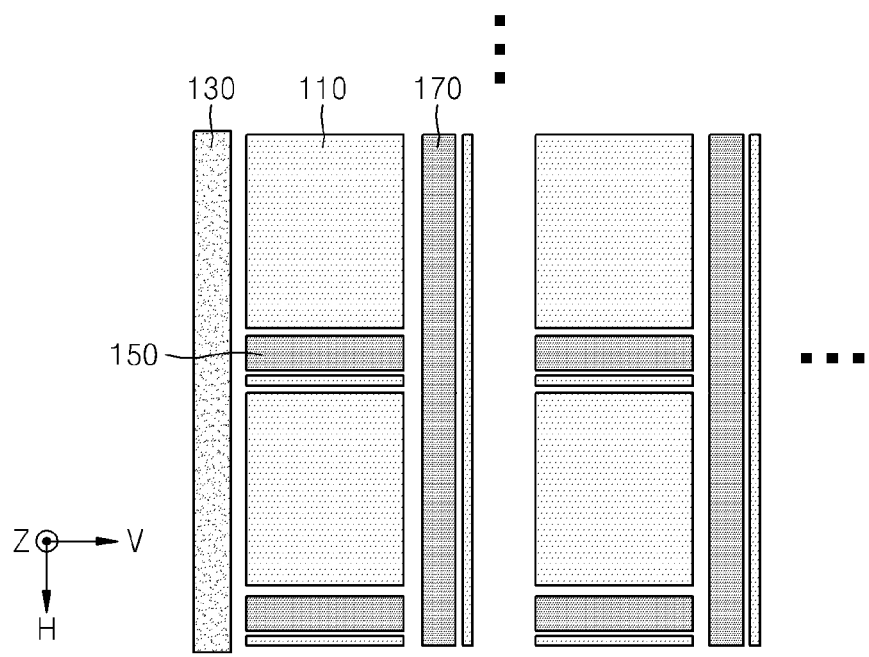

In another example shown in FIG. 9F, a light supply unit 130 may extend along an outer side of one of the outermost columns of arrayed acousto-optic modulation units 110, first sound-wave modulation units 150 may be individually provided for the acousto-optic modulation units 110, respectively, and second sound-wave modulation units 170 may extend along sides of the plurality of columns of the acousto-optic modulation units 110.

Figure 9G:
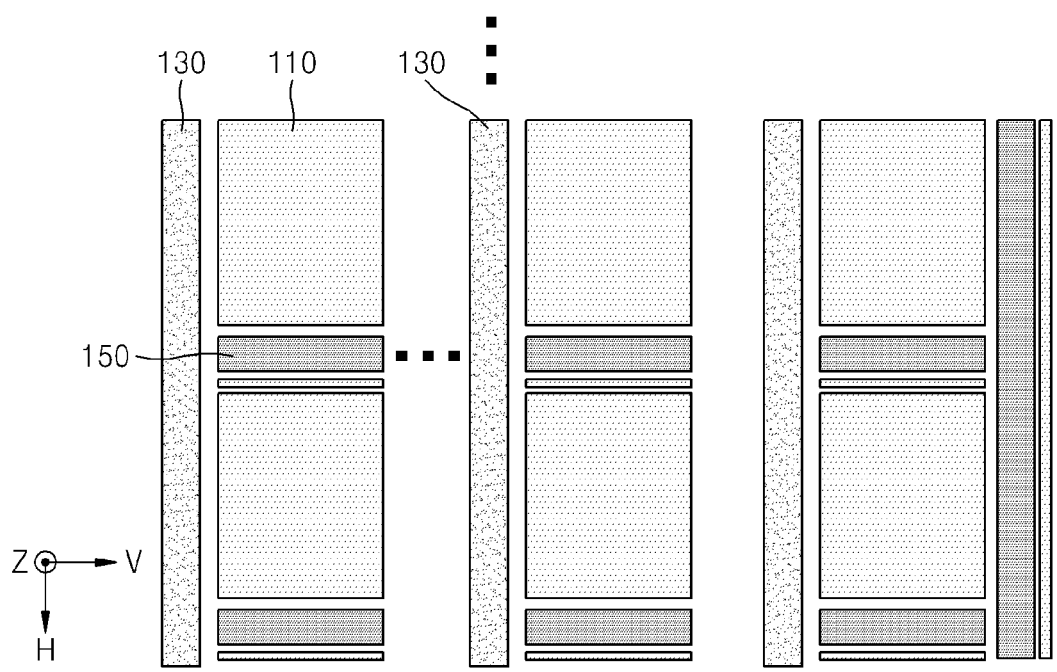

In another example shown in FIG. 9G, light supply units 130 may extend along sides of a plurality of columns of arrayed acousto-optic modulation units 110, first sound-wave modulation units 150 may be individually provided for the acousto-optic modulation units 110, respectively, and a second sound-wave modulation unit 170 may extend along an outer side of one of the outermost columns of the acousto-optic modulation units 110.

Figure 9H:
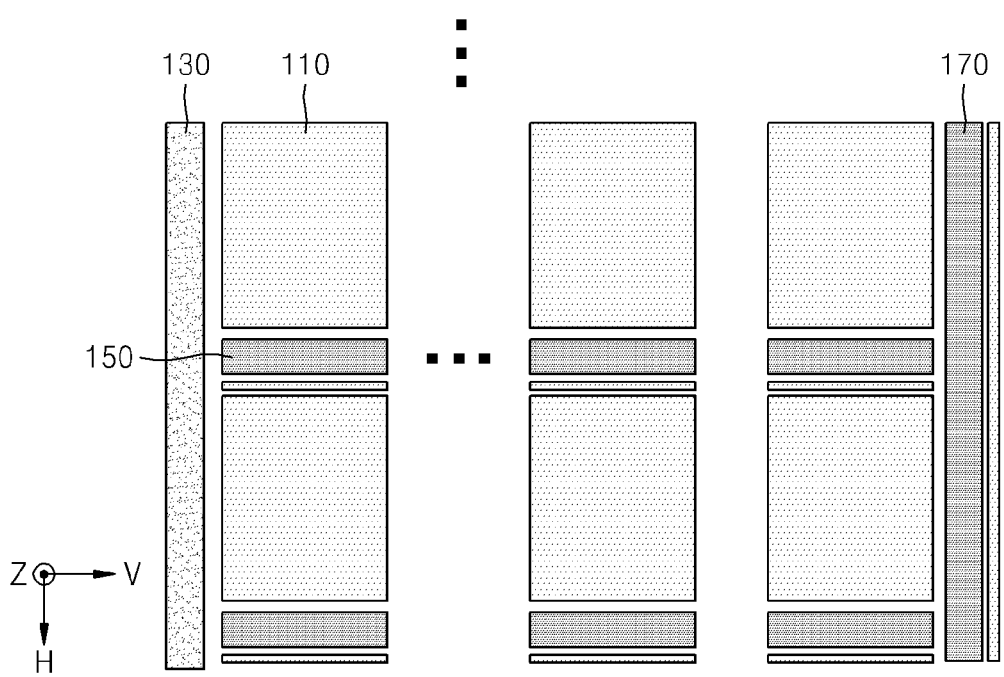

In another example shown in FIG. 9H, a light supply unit 130 may extend along an outer side of one of the outermost columns of arrayed acousto-optic modulation units 110, a second sound-wave modulation unit 170 may extend along an outer side of the other of the outermost columns of the acousto-optic modulation units 110, and first sound-wave modulation units 150 may be individually provided for the acousto-optic modulation units 110, respectively.

The arrangements of the light supply units 130 and the first and second sound-wave modulation units 150 and 170 shown in FIGS. 9A to 9H are examples for forming acousto-optic electrode arrays. That is, it will be apparent to those of ordinary skill in the art that various combinations and modifications may be made therefrom. For example, an arrangement in which first sound-wave modulation units 150 extend along sides of a plurality of rows of arrayed acousto-optic modulation units 110 may be applied to the above-described arrangements.

Figure 10A:
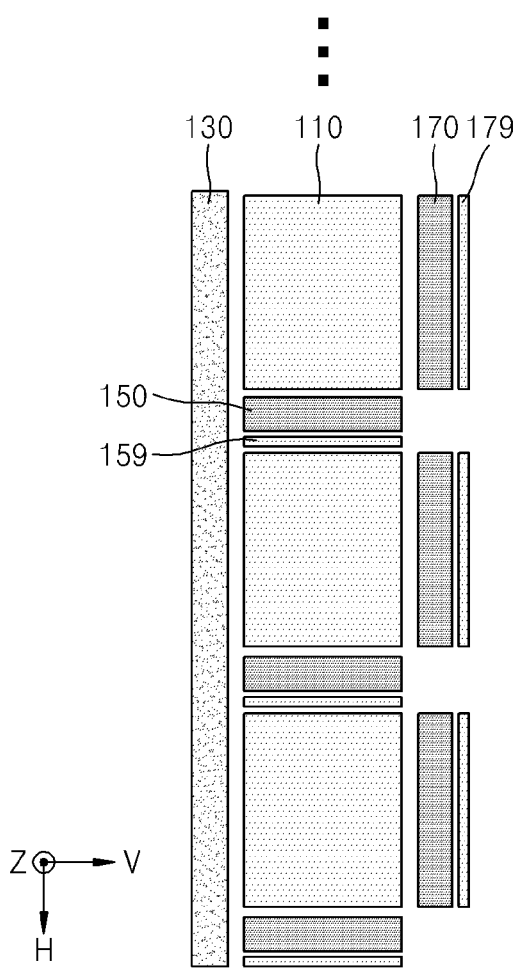
FIGS. 10A to 10C are views illustrating exemplary arrangements of light supply units and first and second sound-wave modulation units in acousto-optic element arrays according to other embodiments.
Figure 10B:
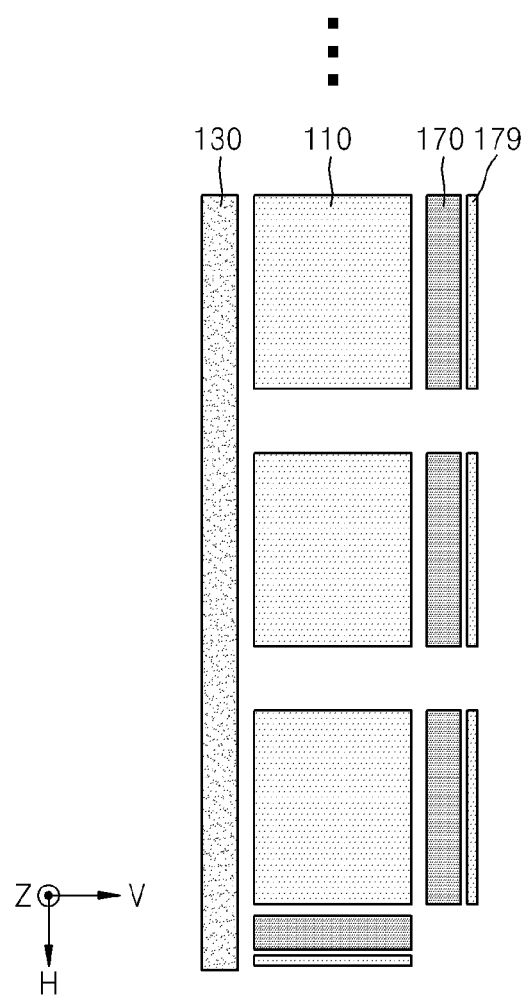
Figure 10C:
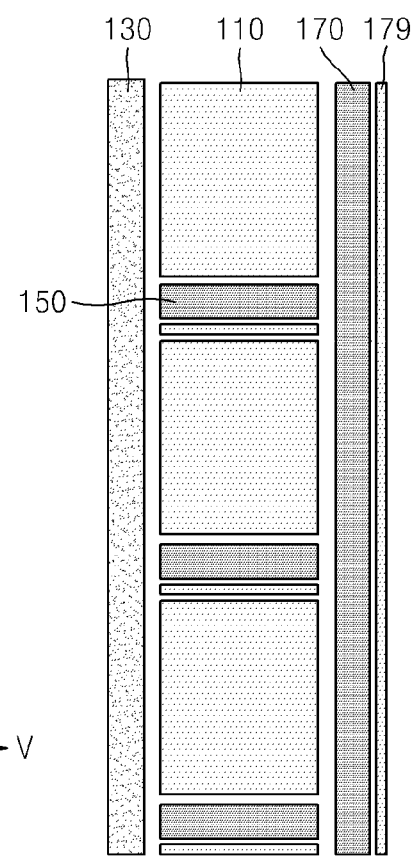

FIGS. 10A to 10C are views illustrating exemplary arrangements of light supply units 130 and first and second sound-wave modulation units 150 and 170 in acousto-optic element arrays according to other embodiments.

In the acousto-optic element arrays shown in FIGS. 10A to 10C, acousto-optic modulation units 110 are arranged in a line. In such one-dimensional acousto-optic element arrays, arrangements of light supply units 130 and first and second sound-wave modulation units 150 and 170 may be variously combined as shown in FIGS. 10A to 10C.

For example, referring to FIG. 10A, a light supply units 130 may extend along an outer side of a column of acousto-optic modulation units 110, and first and second sound-wave modulation units 150 and 170 may be individually provided for the respective acousto-optic modulation units 110. In another example shown in FIG. 10B, a light supply units 130 may extend along an outer side of a column of acousto-optic modulation units 110, a first sound-wave modulation unit 150 may be disposed at a rear end of the column of the acousto-optic modulation units 110, and second sound-wave modulation units 170 may be individually provided for the acousto-optic modulation units 110, respectively. In another example shown in FIG. 10C, a light supply units 130 and a second sound-wave modulation unit 170 may extend along both outer sides of a column of acousto-optic modulation units 110, and first sound-wave modulation units 150 may be individually provided for the acousto-optic modulation units 110, respectively. The arrangements of the light supply units 130 and the first and second sound-wave modulation units 150 and 170 shown in FIGS. 10A to 10C are examples for forming acousto-optic electrode arrays. That is, one of ordinary skill in the art would understand that various combinations and modifications may be made therefrom.

Figure 11:
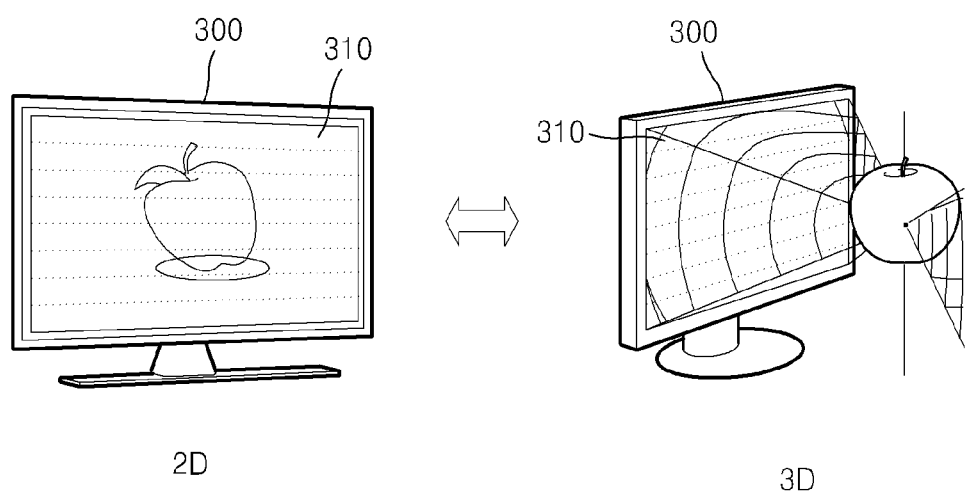
FIG. 11 is a schematic view illustrating a 2D/3D convertible 3-dimensional display apparatus including an acousto-optic element array according to an embodiment.

FIG. 11 is a schematic view illustrating a display apparatus 300 including an acousto-optic element array according to an embodiment.

The display apparatus 300 includes an acousto-optic element array such as those described in the previous embodiments. For example, the display apparatus 300 may include the acousto-optic element array 200 of the previous embodiment (refer to FIG. 7) as a pixel array of a display panel 310.

Since the intensity and direction of light L output from the acousto-optic element array 200 are adjusted by varying the frequencies and the amplitudes and phases by frequency of first and second elastic waves, the acousto-optic element array 200 may be used as a multi-directional, 3-dimensional display panel capable of providing multiple viewpoints. In addition, only the intensity of light L output from the acousto-optic element array 200 may be selectively adjusted. Therefore, the display apparatus 300 using the acousto-optic element array 200 in the display panel 310 may function as a 2D/3D convertible 3-dimensional display apparatus.

Furthermore, since the acousto-optic element array 200 may function as an optical modulator capable of phase modulation, the display apparatus 300 using the acousto-optic element array 200 in the display panel 310 may function as a holographic display apparatus by supplying computer generated holograms (CGHs) to the first and second sound-wave modulation units 150 and 170 as electric signals.

In addition, since the acousto-optic element array 200 may be flat, the display panel 310 using the acousto-optic element array 200 may be a flat display panel, and the display apparatus 300 may also be a flat display apparatus.

It should be understood that the exemplary embodiments described therein should be considered in a descriptive sense only and not for purposes of limitation. Descriptions of features or aspects within each embodiment should typically be considered as available for other similar features or aspects in other embodiments.

While the acousto-optic element, the acousto-optic element array, and the display apparatus including the acousto-optic element have been described according to the embodiments with reference to the figures, it will be understood by those of ordinary skill in the art that various changes in form and details may be made therein without departing from the spirit and scope of the embodiments as defined by the following claims.

What is claimed is:

1. An acousto-optic element array comprising a plurality of acousto-optic elements, wherein the plurality of acousto-optic elements comprise:
   at least three acousto-optic modulators comprising an acousto-optic layer formed of an acousto-optic material;
   a light supplier which supplies light to the at least three acousto-optic modulators in a first direction;
   a first sound-wave modulator which applies first elastic waves to the at least three acousto-optic modulators in a second direction; and
   a second sound-wave modulator which applies second elastic waves to the at least three acousto-optic modulators in a third direction,
   wherein the light supplied from the light supplier to the at least three acousto-optic modulators is deflected by diffraction caused by the first elastic waves applied from the first sound-wave modulator and diffraction caused by the second elastic waves applied from the second sound-wave modulator, and is output from the acousto-optic modulators through a front side of the acousto-optic modulator,
   wherein the at least three acousto-optic modulators are arranged in at least one line in a direction perpendicular to the first direction in which the light is supplied to the at least three acousto-optic modulators.

2. The acousto-optic element array of claim 1, wherein the at least one line is a single line.

3. The acousto-optic element array of claim 2, wherein the light supplier, the first sound-wave modulator, and the second sound-wave modulator of each of the plurality of acousto-optic elements are disposed at different positions of a front end, a rear end, a side, and an other side of the single line of the least three acousto-optic modulators.

4. The acousto-optic element array of claim 3, wherein one of the light supplier, the first sound-wave modulator, and the second sound-wave modulator which is disposed at the side or the other side of the single line of the at least three acousto-optic modulators is formed to extend along the single line and is commonly used for the at least three acousto-optic modulators.

5. The acousto-optic element array of claim 3, wherein one of the light supplier, the first sound-wave modulator, and the second sound-wave modulator which is disposed at the side or the other side of the at least one line of the at least three acousto-optic modulators is individually provided for each of the at least three acousto-optic modulators.

6. The acousto-optic element array of claim 3, wherein one of the light supplier, the first sound-wave modulator, and the second sound-wave modulator which is disposed at the front end or the rear end of the at least one line of the at least three acousto-optic modulators is commonly used for the at least three acousto-optic modulators.

7. The acousto-optic element array of claim 1, wherein the at least three acousto-optic modulators are arranged in a plurality of columns and a plurality of rows.

8. The acousto-optic element array of claim 7, wherein the light supplier of the plurality of acousto-optic elements extends along an outer side of one of outermost columns of the plurality of columns of the at least three acousto-optic modulators.

9. The acousto-optic element array of claim 7, wherein the light supplier of the plurality of acousto-optic elements extends along sides of the respective columns of the at least three acousto-optic modulators.

10. The acousto-optic element array of claim 7, wherein the first sound-wave modulator of the plurality of acousto-optic elements extends along an outer side of one of outermost rows of the at least three acousto-optic modulators.

11. The acousto-optic element array of claim 7, wherein the first sound-wave modulator included in each of the plurality of acousto-optic elements is arranged along an outer side of one of outermost rows of the at least three acousto-optic modulators, so as to be respectively disposed at the plurality of columns of the at least three acousto-optic modulators.

12. The acousto-optic element array of claim 7, wherein the first sound-wave modulator included in each of the plurality of acousto-optic elements is formed to extend along sides of the respective rows of the at least three acousto-optic modulators.

13. The acousto-optic element array of claim 7, wherein the first sound-wave modulator included in each of the plurality of acousto-optic elements is individually arranged at sides of the respective rows of the at least three acousto-optic modulators.

14. The acousto-optic element array of claim 8, wherein the second sound-wave modulator of the plurality of acousto-optic elements extends along the outer side of an other of the outermost columns of the plurality of columns of the at least three acousto-optic modulators.

15. The acousto-optic element array of claim 8, wherein the second sound-wave modulator included in each of the plurality of acousto-optic elements is arranged along the outer side of an other of the outermost columns of the plurality of columns of the at least three acousto-optic modulators, so as to be respectively disposed at the rows of the at least three acousto-optic modulators.

16. The acousto-optic element array of claim 7, wherein the second sound-wave modulator included in each of the plurality of acousto-optic elements is formed to extend along sides of the respective columns of the at least three acousto-optic modulators.

17. The acousto-optic element array of claim 7, wherein the second sound-wave modulator included in each of the plurality of acousto-optic elements is individually arranged at sides of the respective columns of the at least three acousto-optic modulators.

18. A display apparatus comprising a display panel comprising an acousto-optic element array, the acousto-optic element array comprising a plurality of acousto-optic elements, wherein the plurality of acousto-optic elements comprise:
    at least three acousto-optic modulators comprising an acousto-optic layer formed of an acousto-optic material;
    a light supplier which supplies light to the at least three acousto-optic modulators in a first direction;
    a first sound-wave modulator which applies first elastic waves to the at least three acousto-optic modulators in a second direction; and
    a second sound-wave modulator which applies second elastic waves to the at least three acousto-optic modulators in a third direction,
    wherein the light supplied from the light supplier to the at least three acousto-optic modulators is deflected by diffraction caused by the first elastic waves applied from the first sound-wave modulator and diffraction caused by the second elastic waves applied from the second sound-wave modulator, and is output from the at least three acousto-optic modulators through a front side of the at least three acousto-optic modulators,
    wherein the at least three acousto-optic modulators are arranged in at least one line in a direction perpendicular to the first direction in which the light is supplied to the at least three acousto-optic modulators,
    wherein a plurality of images are displayed by controlling at least one of directions, phases, and intensities of light output from front sides of the at least three acousto-optic modulators 2-dimensionally arranged in the display panel.

19. The display apparatus of claim 18, wherein the display apparatus displays 2-dimensional images having a single viewpoint regardless of the directions of the light output from the display panel.

20. The display apparatus of claim 18, wherein the display panel adjusts viewpoint data of the plurality of images according to the directions of the light output from the display panel so as to form at least two visual fields for displaying 3-dimensional images.

21. The display apparatus of claim 18, wherein switching between 2-dimensional images and 3-dimensional images is performed by selectively adjusting image data according to the directions of the light output from the display panel.

22. The display apparatus of claim 20, wherein the at least two visual fields are formed in at least one of a horizontal direction and a vertical direction.

23. The display apparatus of claim 18, wherein the plurality of images are a plurality of hologram images which are displayed by adjusting the intensities and the phases of the light output from the display panel according to the directions of the light.

* * * * *